(12) United States Patent
Nakagawa et al.

(10) Patent No.: US 6,832,479 B2
(45) Date of Patent: Dec. 21, 2004

(54) RESIN PISTON FOR MASTER CYLINDER IN BRAKE SYSTEM, MASTER CYLINDER, DIE FOR MOLDING RESIN PISTON FOR MASTER CYLINDER, AND MANUFACTURING METHOD OF RESIN PISTON FOR MASTER CYLINDER

(75) Inventors: Keiji Nakagawa, Yokosuka (JP); Yukihiro Honda, Yokosuka (JP)

(73) Assignee: Bosch Braking Systems Co. Ltd., Tokyo (JP)

( * ) Notice: Subject to any disclaimer, the term of this patent is extended or adjusted under 35 U.S.C. 154(b) by 0 days.

(21) Appl. No.: 10/004,221

(22) Filed: Oct. 26, 2001

(65) Prior Publication Data
US 2002/0050137 A1 May 2, 2002

(30) Foreign Application Priority Data
Nov. 1, 2000 (JP) ........................... 2000/334993

(51) Int. Cl.[7] ................................................. F15B 7/08
(52) U.S. Cl. ............................................................ 60/589
(58) Field of Search ........................ 60/589; 264/328.8, 264/328.9

(56) References Cited

U.S. PATENT DOCUMENTS

| 5,421,718 A | 6/1995 | Karlsson et al. |
| 5,690,884 A | 11/1997 | Cerny |

FOREIGN PATENT DOCUMENTS

| DE | 3932248 | * 4/1990 | .................. 60/589 |
| GB | G2093755 A | 9/1982 | |
| JP | 58128830 | 8/1983 | |
| JP | 2-28134 | 7/1990 | ........... B60T/11/16 |
| JP | 04312809 | 4/1992 | |
| JP | 05044593 | 2/1993 | |
| JP | 11070774 | 3/1999 | |
| JP | 2000159088 A | 6/2000 | ........... B60T/11/16 |

OTHER PUBLICATIONS

Pye, Injection Mouldinn Design, Kent, Great Britain, George Goodwin Publishiers1978, pp236–237, TP1150P91978.*

Japanese Publication No. Sho 58–29414, published Feb. 25, 1983.

Japanese Publication No. Sho 61–73465, published May 19, 1986.

Japanese Publication No. 03291606 A, published Dec. 20, 1991.

Japanese Publication No. 11157436 A, published Jun. 15, 1999.

* cited by examiner

*Primary Examiner*—F. Daniel Lopez
(74) *Attorney, Agent, or Firm*—Priest & Goldstein, PLLC

(57) ABSTRACT

An upper die and a lower die are combined. A core for molding a concavity and another core are combined with the combined upper die and the lower die at respective prescribed positions. A core for through-hole molding is constructed by the junction of cores that are severally formed with the upper die and the lower die integrally on the extension line of the central axis of the core for molding a concavity. A through-hole is molded with the core for through-hole molding. A concavity in which a valve mechanism is equipped and a communicating hole through which the concavity communicates with the through-hole are molded with the core for molding a concavity. The core for through-hole molding includes an impact hole, in which a tip of the core for molding a concavity is impacted.

2 Claims, 7 Drawing Sheets

RESIN PISTON FOR MASTER CYLINDER IN BRAKE SYSTEM, MASTER CYLINDER, DIE FOR MOLDING RESIN PISTON FOR MASTER CYLINDER, AND MANUFACTURING METHOD OF RESIN PISTON FOR MASTER CYLINDER

BACKGROUND OF THE INVENTION

1. Field of the Invention

The present invention relates to a resin piston for mounting in a master cylinder in a brake system used for a vehicle and the like, for transforming brake treading force into a fluid pressure to operate a brake mechanism formed in each wheel. The invention further relates to the master cylinder, a die for molding the resin piston for the master cylinder, and a method of the manufacturing resin piston for the master cylinder.

2. Description of the Related Art

As the prior art concerning such types of resin pistons for a master cylinder, a resin piston for a master cylinder can be cited that is disclosed in Japanese Utility Model Publication No. Hei. 2-28134 and Japanese Laid-Open Patent Publication No. 2000-159088. When such a resin piston for a master cylinder is molded by injection molding, as shown in FIG. 7 of the present specification, an upper die 11 and a lower die 12, and a core for molding a concavity 13 and a core 14 are combined, and then a resin material is injected through a resin material injection hole 21 formed in the core 14. Then, after the resin material has been solidified, the core for molding a concavity 13 and the core 14 are pulled out, and the upper die 11 and the lower die 12 are removed. Thus, a resin piston for a master cylinder 1 is molded.

In the resin piston for a master cylinder 1 molded in such a way, as shown in FIG. 2, a valve mechanism 41 is fixed in a concavity 31 of the resin piston for a master cylinder 1 in a state such that a stem 42, being a part of the valve mechanism 41, is inserted into a communicating hole 32. The valve mechanism 41 opens its valve in a state such that the stem 42 is touched to a stopper pin 43 disposed in the through-hole 33 of the resin piston for a master cylinder 1, and closes the valve in a state such that the stem 42 is separated from the stopper pin 43.

In the communicating hole 32 of the resin piston for a master cylinder 1 that is molded by injection molding using the dies 11, 12 and the cores 13, 14 shown in FIG. 7, burrs are formed at a communicating section 51 in a direction to cover the communicating hole 32 along a surface at which the upper die 11 and the lower die 12 are touched with the core for molding a concavity 13. The burrs are formed because the resin material flows into small gaps between the surfaces at which the upper die 11 and the lower die 12 are touched to the core for molding a concavity 13 in the process of the molding of the resin piston for a master cylinder 1. The generation of the burrs depends on the precision of the dies, but it is very difficult to eliminate the generation of the burrs completely. Moreover, also in the case where glass fibers are mixed with the resin material with the object of increasing the strength of the resin piston for a master cylinder 1, it is difficult to eliminate generation of burrs because it is apprehended that, when the burrs are scraped off after injection molding, the resin surfaces at the places where the burrs have been scraped off become roughened and the stem 42 is caught by the roughened surfaces. Then, a problem is generated such that the stem 42 becomes unmovable because the stem 42 is caught by the burrs and then the valve mechanism 41 becomes impossible to work.

SUMMARY OF THE INVENTION

One object of the present invention is to provide a resin piston for a master cylinder capable of preventing a valve mechanism from becoming impossible to work because the stem of the valve mechanism is caught by burrs generated in the communicating hole of the resin piston for a master cylinder in the process of the injection molding thereof.

For attaining the object, a first aspect of the present invention is a resin piston for a master cylinder including a through-hole through which a stopper pin, being a component of a valve mechanism of the master cylinder, is inserted, a concavity in which the valve mechanism is fixed by being inserted therein, and a communicating hole communicating with the through-hole from the concavity, the resin piston for a master cylinder being molded by the injection of a resin material, wherein a burr to be generated by a flow of the resin material into a gap between a combined molding die and a core in a process of molding of the resin piston for a master cylinder by injection molding projects out of the communicating hole into the through-hole.

As described above, because the burr to be generated in the resin piston for a master cylinder projects out of the communicating hole, the burr does not interfere with the movement of a stem inserted into the communicating hole. According to the first aspect of the invention, operation and an effect of the resin piston for a master cylinder can be obtained such that it is prevented that the stem of the valve mechanism is caught by a burr that can be generated in the communicating hole of a resin piston for a master cylinder in the process of the injection molding to disable the valve mechanism from working.

A second aspect of the invention is a resin piston for a master cylinder including a through-hole through which a stopper pin, being a component of a valve mechanism of the master cylinder, is inserted, a concavity in which the valve mechanism is fixed by being inserted therein, and a communicating hole communicating with the through-hole from the concavity, the resin piston for a master cylinder being molded by injection of a resin material, wherein: the through-hole is molded with a core for through-hole molding; the concavity and the communicating hole are molded with a core for molding a concavity; and a part where the through-hole communicates with the communicating hole is molded in a state such that an end of the core for molding a concavity is impacted in an impact hole formed on the core for through-hole molding.

As described above, because the communicating part is molded in the state such that the end of the core for molding a concavity is impacted in an impact hole formed on the core for through-hole molding, a burr formed at the part where the communicating hole communicates with the through-hole is formed by the flow of the resin material into a gap between the end of the core for molding a concavity and the impact part. As a result, because the burr formed at the part where the communicating hole communicates with the through-hole is formed in the shape of a protrusion into the through-hole along the inner wall surface of the communicating hole, the shape of the burr does not interfere with the movement of a stem inserted in the communicating hole. According to the second aspect of the invention, operation and an effect of the resin piston for a master cylinder can be obtained such that it is prevented that the stem of the valve mechanism is caught by a burr that can be generated in the communicating hole of a resin piston for a master cylinder in the process of the injection molding to disable the valve mechanism from working.

A third aspect of the invention is the resin piston for a master cylinder as in the second aspect, wherein: the resin piston for a master cylinder is molded with a die formed by a combination of a first die and a second die, the first die including a first core, the second die including a second core; and the core for through-hole molding is constructed by a combination of the first core and the second core, whereby the impact hole is formed.

By the construction of the die for molding the resin piston for a master cylinder in such a way, it becomes possible to form the first die and the second die in a symmetrical shape. Thereby, according to the third aspect of the invention, operation and an effect of the resin piston for a master cylinder can be obtained such that the manufacture of the die is made easy in addition to the operation and the effect of the resin piston for a master cylinder of the second aspect.

A fourth aspect of the invention is the resin piston for a master cylinder as in any one of the aspects 1–3, wherein a groove is provided in a portion of an inner wall surface of said through-hole, the groove facing said communicating hole, the groove being in the shape of a flat surface oriented in a direction substantially perpendicular to the longitudinal direction in which said stopper pin is travels in operation of said master cylinder.

By the formation of such a groove in the through-hole, the surface of the through-hole becomes a flat surface nearby the impact hole which is formed in the core for through-hole molding and in which the core for molding a concavity is impacted. By the formation of the flat surface nearby the impact hole in such a way, the precision of the core for through-hole molding in the vicinity of the impact hole is easily heightened more than the case where the surface is a curved surface, and a burr generated in the vicinity of the impact hole can be made smaller than that in the case where the surface is a curved surface. Thereby, according to the fourth aspect of the invention, operation and an effect of the resin piston for a master cylinder can be obtained such that burrs can be made small in addition to the operation and the effects of the resin piston for a master cylinder as in any one of the first to the third aspects.

A fifth aspect of the invention is the resin piston for a master cylinder as in the fourth aspect, wherein the width of the groove is narrower than that of the through-hole and wider than the diameter of the stopper pin.

By the formation of the width of the groove to be narrower than that of the through-hole and wider than the diameter of the stopper pin, the position of a reciprocation end of the resin piston for a master cylinder, the reciprocation width of which is regulated by the stopper pin inserted in the through-hole while the resin piston is reciprocating, becomes easy to adjust. Thereby, according to the fifth aspect of the invention, operation and an effect of the resin piston for a master cylinder can be obtained such that the positioning of the reciprocation end of the resin piston for a master cylinder becomes easy in addition to the operation and the effects of the resin piston for a master cylinder as in the fourth aspects.

A sixth aspect of the invention is the resin piston for a master cylinder as in any one of the first to fifth aspects, wherein the through-hole includes a projecting part for preventing the stopper pin from being touched to the inner wall surface nearby a part with which the communicating hole communicates.

By the construction such that the stopper pin inserted in the through-hole is not touched to the inner wall surface nearby a part with which the communicating hole communicates, there are no possibilities that the stopper pin pushes the burrs generated at that part to bend them. Thereby, according to the sixth aspect of the invention, operation and an effect of the resin piston for a master cylinder can be obtained such that it can be prevented that the burrs that have been pushed and bent interfere with the stem of the valve mechanism inserted in the communicating hole to disable the valve mechanism from working in addition to the operation and the effects of the resin piston for a master cylinder as in any one of the first to the fifth aspects.

A seventh aspect of the invention is a resin piston for a master cylinder including a through-hole through which a stopper pin, being a component of a valve mechanism of the master cylinder, is inserted, a concavity in which the valve mechanism is fixed by being inserted therein, and a communicating hole communicating with the through-hole from the concavity, the resin piston for a master cylinder being molded by injection of a resin material, wherein: the through-hole is molded with a core for through-hole molding; the concavity and the communicating hole are molded with a core for molding a concavity; and an inner wall surface of the through-hole nearby a part where the communicating hole communicates with the through-hole is in a shape of a flat surface.

According to the resin piston for a master cylinder of the seventh aspect, the same operation and the same effect can be obtained as those of the resin piston for a master cylinder of the fourth aspect. Then, burrs can be made small regardless of the directions in which the burrs protrude.

An eighth aspect of the invention is a master cylinder equipped with the resin piston for a master cylinder as in any one of the first to the seventh aspects.

According to the master cylinder of the eighth aspect, such operation and an effect can be obtained as are brought about by the resin piston for a master cylinder as in any one of the first to the seventh aspects in the master cylinder.

A ninth aspect of the invention is a die for molding a resin piston for a master cylinder, the die molding a resin piston for a master cylinder, the resin piston for a master cylinder including a through-hole through which a stopper pin, being a component of a valve mechanism of the master cylinder, is inserted, a concavity in which the valve mechanism is fixed by being inserted therein, and a communicating hole communicating with the through-hole from the concavity, the resin piston for a master cylinder being molded by the injection of a resin material, the die comprising a core for through-hole molding for molding the through-hole and a core for molding a concavity for molding the concavity and the communicating hole, wherein a part where the through-hole communicates with the communicating hole is constructed such that the part is molded in a state in which an end of the core for molding a concavity is impacted in an impact hole formed on the core for through-hole molding.

According to the ninth aspect of the invention, the same operation and the same effect can be obtained for a master cylinder molded by the injection molding with the die for molding a resin piston for a master cylinder as those of the aforesaid resin piston for a master cylinder of the second aspect.

A tenth aspect of the invention is a method of manufacturing a resin piston for a master cylinder including a through-hole through which a stopper pin, being a component of a valve mechanism of the master cylinder, is inserted, a concavity in which the valve mechanism is fixed by being inserted therein, and a communicating hole communicating with the through-hole from the concavity, the resin piston for a master cylinder being molded by the injection of a resin material, the manufacturing method comprising the steps of: molding the through-hole with a core for through-hole molding; molding the concavity and the communicating hole with a core for molding a concavity; and molding a part where the through-hole communicates with the communicating hole in a state such that an end of the core for molding a concavity is impacted in an impact hole formed on the core for through-hole molding.

According to the tenth aspect of the invention, the same operation and the same effect can be obtained for the resin piston for a master cylinder manufactured by the manufacturing method of a resin piston for a master cylinder as those of the aforesaid resin piston for a master cylinder of the second aspect.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Hereinafter, embodiments of the present invention are described by reference to the attached drawings.

Figure 1:
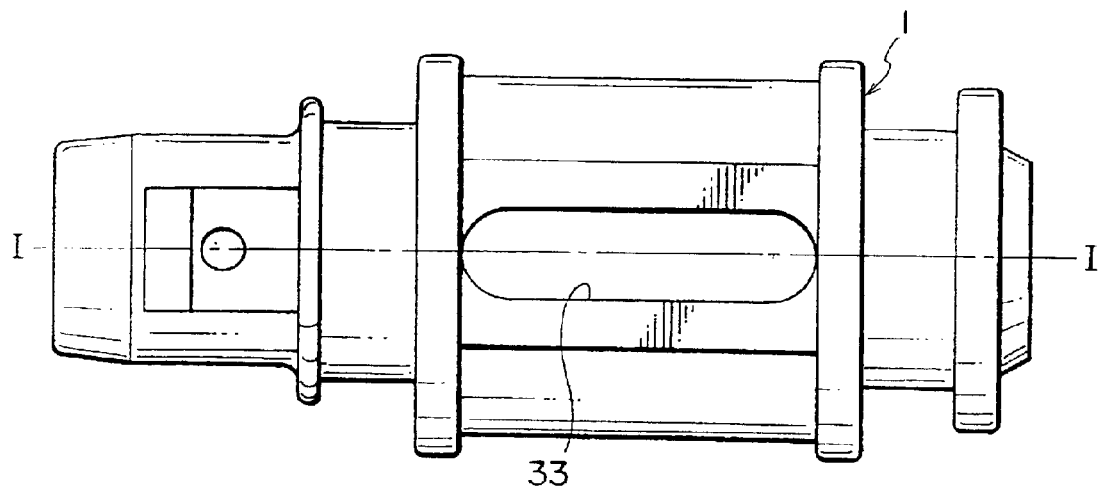
FIG. 1 is a plan view of the resin piston for a master cylinder of a first embodiment according to the present invention.
Figure 2:
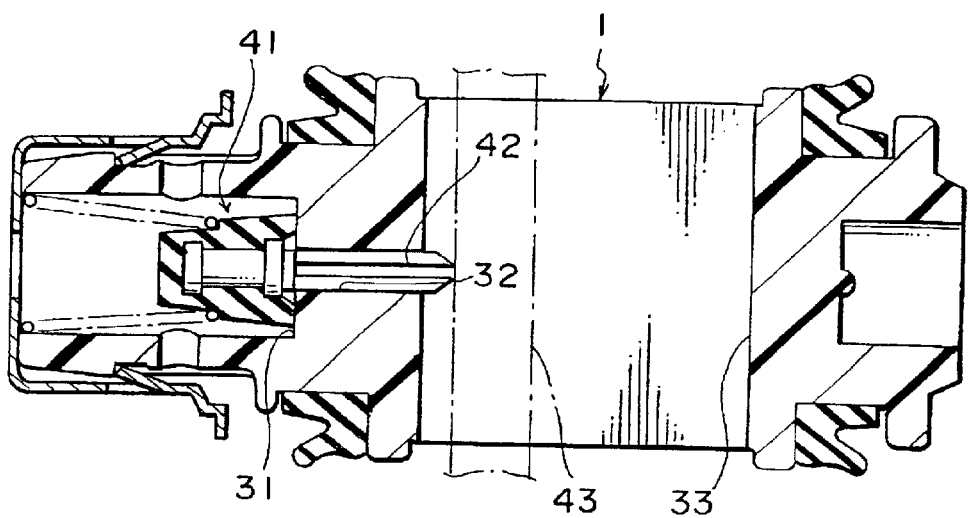
FIG. 2 is a sectional view along the I—I line in a state such that a valve mechanism is inserted in the resin piston for a master cylinder of FIG. 1 to be touched with the resin piston.

FIG. 1 is a plan view of the resin piston for a master cylinder of a first embodiment according to the present invention; and FIG. 2 is a sectional view along the I—I line in a state such that a valve mechanism is inserted in the resin piston for a master cylinder of FIG. 1 to be touched with the resin piston.

A resin piston for a master cylinder 1 is slidably impacted in the cylinder hole of a master cylinder not shown. The valve mechanism 41 is equipped in the concavity 31 in the shape of a concave circle. The valve mechanism 41 opens and shuts the communication of fluid between a fluid pressure chamber of the master cylinder, not shown, and an operation fluid reservoir. The communicating hole 32 is a circular hole having a diameter smaller than that of the concavity 31, and the communicating hole 32 makes the concavity 31 communicate with the through-hole 33. The through-hole 33 is an elongated hole formed in the central part in the axial direction of the resin piston for a master cylinder 1. The valve mechanism 41 includes the stem 42 inserted in the communicating hole 32, and the stopper pin 43 to which an end of the stem 42 can be touched and which is inserted in the through-hole 33. The valve mechanism 41, as being known, has a configuration to open the valve thereof by the touching of the end of the stem 42 to the stopper pin 43 owing to a push and a move of the resin piston for a master cylinder 1 caused by the operation of the master cylinder, and to close the valve by the separation of the end of the stem 42 from the stopper pin 43.

Figure 3A:
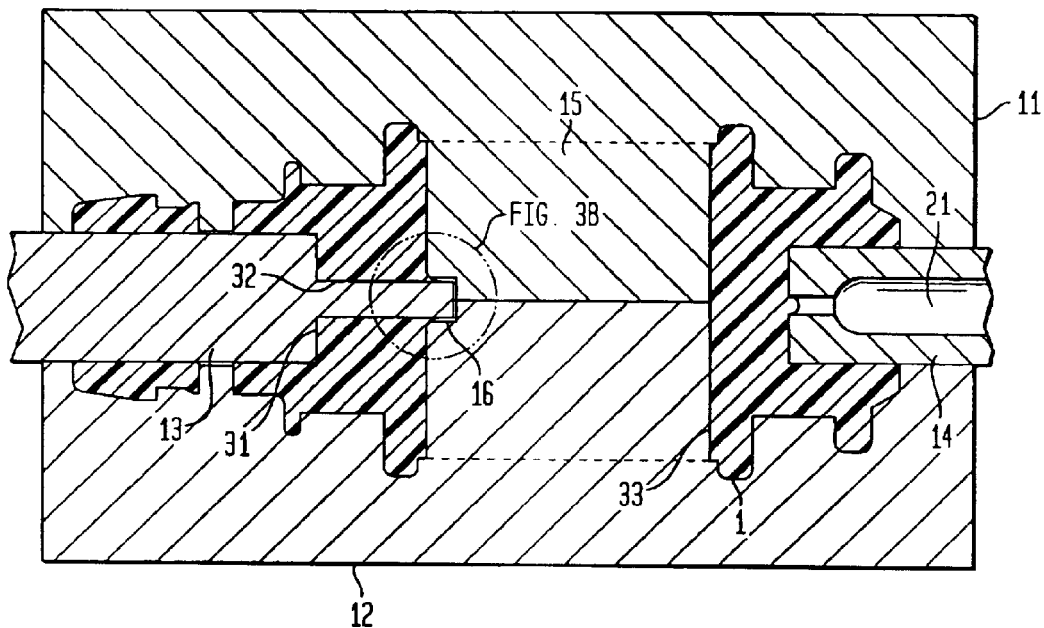
FIG. 3 is a sectional view showing the resin piston for a master cylinder of the first embodiment according to the preset invention and dies and cores for the injection molding of the resin piston for a master cylinder.
Figure 3B:
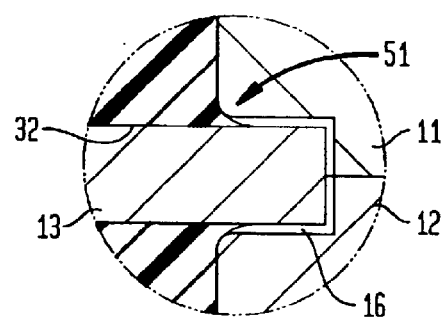

FIG. 3 is a sectional view showing the resin piston for a master cylinder 1 of the first embodiment according to the present invention, and dies and cores for the injection molding of the resin piston for a master cylinder 1.

The upper die 11 and the lower die 12 are combined, and the core for molding a concavity 13 and the core 14 are combined with the combined upper die 11 and the lower die 12 at respective prescribed positions. A core for through-hole molding 15 is constructed by the junction of the cores, which are provided for in the upper die 11 and the lower die 12 severally to be integrated, on the extension line of the central axis of the core for molding a concavity 13. The through-hole 33 is molded with the core for through-hole molding 15. The concavity 31 to be equipped with the valve mechanism 41 and the communicating hole 32, making the concavity 31 communicate with the through-hole 33, are molded with the core for molding a concavity 13. The core for through-hole molding 15 includes an impact hole 16, in which a tip of the core for molding a concavity 13 is impacted. The upper die 11 and the lower die 12 severally have a symmetrical shape, and thereby the dies can easily be manufactured.

Then, a resin material is injected from the resin material injection hole 21 formed in the core 14 to mold the resin piston for a master cylinder 1. At this time, burrs, which are generated by the flow of the resin material into a slight gap between the impact hole 16 and the core for molding a concavity 13 at the communicating section 51 where the communicating hole 32 communicates with the through-hole 33, are molded in a state of a protrusion into the through-hole 33 along the communicating hole 32 as shown in the drawing. Consequently, no burrs are generated on the inner wall surface of the communicating hole 32.

Because the burrs molded in such a way at the communicating section 51 protrude into the through-hole 33 along the communicating hole 32, the burrs do not interfere with the operation of the stem 42 inserted in the communicating hole 32. Thereby, it can be prevented that the stem 42 is caught by the burrs molded at the communicating section 51 to disable the work of the valve mechanism 41.

Figure 4A:
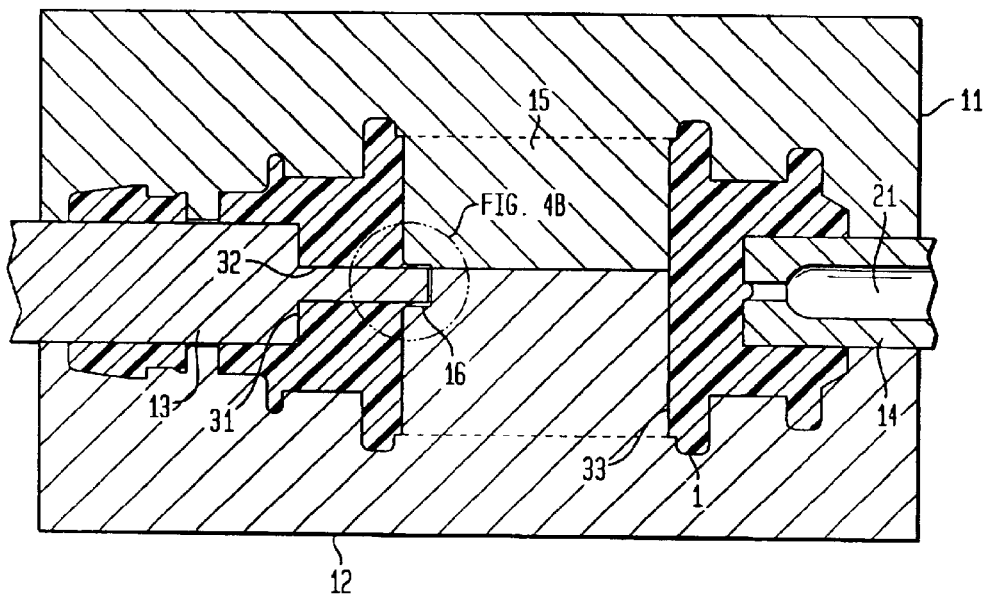
FIG. 4 is a sectional view showing the resin piston for a master cylinder of a second embodiment according to the preset invention and dies and cores for the injection molding of the resin piston for a master cylinder.
Figure 4B:
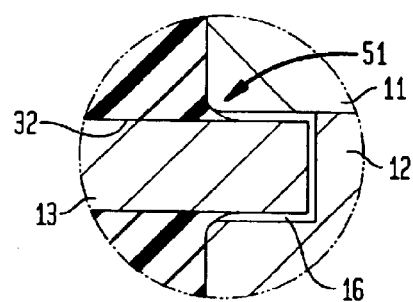

Next, as a second embodiment according to the present invention, a resin piston for a master cylinder as shown in FIG. 4 can be provided. In the resin piston of the second embodiment, the position of the junction surface of the core for through-hole molding 15, which is placed on the extension line of the central axis of the core for molding a concavity 13 in the first embodiment, is shifted from the extension line of the central axis of the core for molding a concavity 13.

Even if the core for through-hole molding 15 is thus constructed, the implementation of the present invention is possible. In this case also, because the burrs molded at the communicating section 51, likewise in the first embodiment, protrude into the through-hole 33 along the communicating hole 32, the burrs do not interfere with the movement of the stem 42 that is inserted in the communicating hole 32. Then, it is possible to prevent the stem 42 from being caught by the burrs, molded at the communicating section 51, to disable the operation of the valve mechanism 41.

Figure 5:
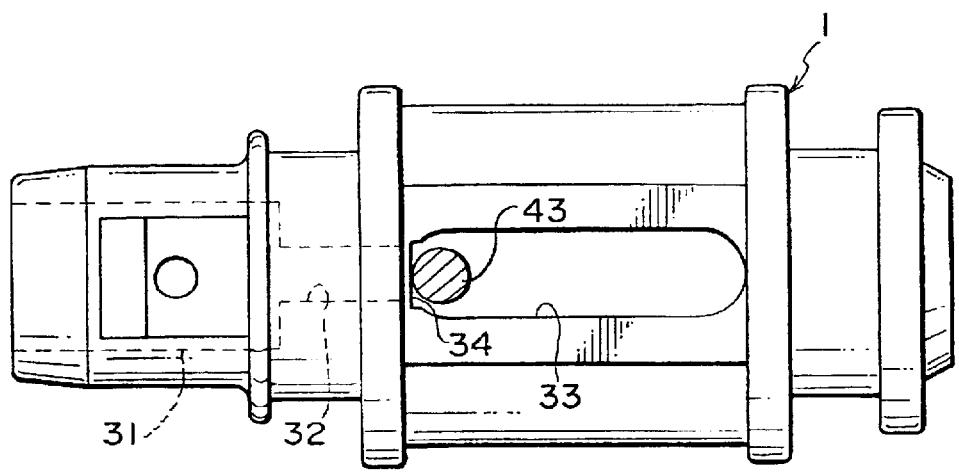
FIG. 5 is a plan view of the resin piston for a master cylinder of a third embodiment according to the preset invention.

Furthermore, as a third embodiment according to the present invention, a resin piston for a master cylinder as shown in FIG. 5 is provided. In the resin piston of the third embodiment, a groove 34 is formed in addition to the form of the first embodiment or the second embodiments. The groove 34 is formed in such a way that the inner wall surface of the through-hole 33 becomes flat at a part thereof nearby a position where the communicating hole 32 communicates with the through-hole 33 in the direction of the insertion of the stopper pin 43.

By the provision of such a groove 34 for the through-hole 33, a surface of the through-hole 33 is made flat nearby the impact hole 16 which is formed in the core for through-hole molding 15 and in which the core for molding a concavity 13 is impacted. Then, the flat formation of the surface of the through-hole 33 nearby the impact hole 16 makes it easier to heighten the precision of the core for through-hole molding 15 nearby the impact hole 16 than in a case where the surface is a curved surface. Consequently, burrs to be generated nearby the impact hole 16 can be smaller in comparison with the case where the groove 34 is not formed and the surface of the through-hole 33 nearby the impact hole 16 is a curved surface. Moreover, because the inner wall surface of the through-hole 33 becomes flat nearby a position where the communicating hole 32 communicates, the contact area where burrs form is in such a state that they protrude into the through-hole 33 and the radiused surface of the stopper pin 43 becomes small when the radiused surface of the stopper pin 43 is touched to the part of the through-hole 33 where the communicating hole 32 communicates with the through-hole 33.

Consequently, it can be prevented that the stem 42 is caught by the burrs, molded at the communicating section 51, to disable the work of the valve mechanism 41. Moreover, the following possibility becomes small. That is, the stopper pin 43 pushes and bends the burrs, and the burrs that have been pushed and bent catch the stem 42 inserted into the communicating hole 32. Moreover, because the surface of the through-hole 33, to which the stopper pin 43 inserted into the through-hole 33 is touched, is a flat surface, the operation and the effect can also be obtained such that the positioning of the reciprocation end of the reciprocating resin piston for a master cylinder 1 can be performed more correctly when the position of the reciprocation end is set while the reciprocation width of the resin piston 1 is regulated by the stopper pin 43.

Furthermore, as a fourth embodiment according to the present invention, a resin piston for a master cylinder is provided. The resin piston of the fourth embodiment is equipped with a projecting part 35 for preventing the stopper pin 43 from being touched to the inner wall surface of the through-hole 33 at a part thereof nearby a position where the communicating hole 32 communicates with the through-hole 33 in addition to the form of any one of the first to third embodiments.

Figure 6A:
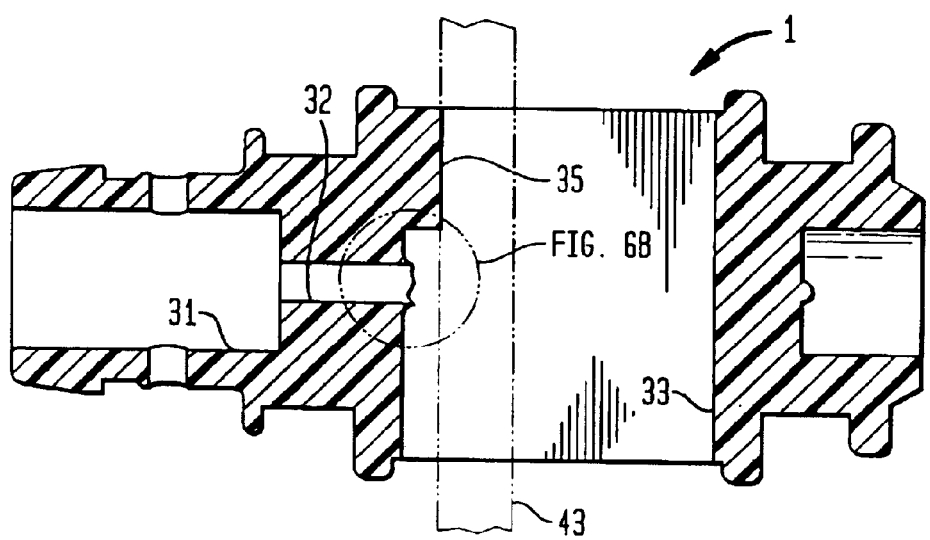
FIG. 6 is a sectional view of the resin piston for a master cylinder of a fourth embodiment according to the preset invention.
Figure 6B:
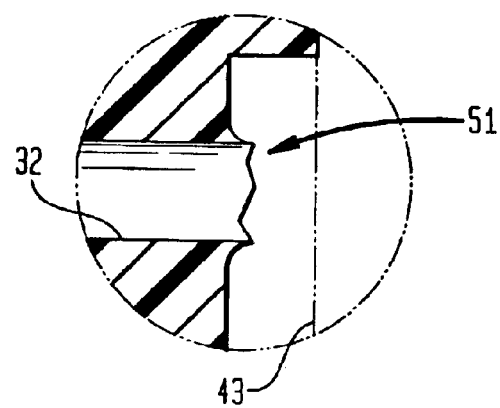
Figure 7A:
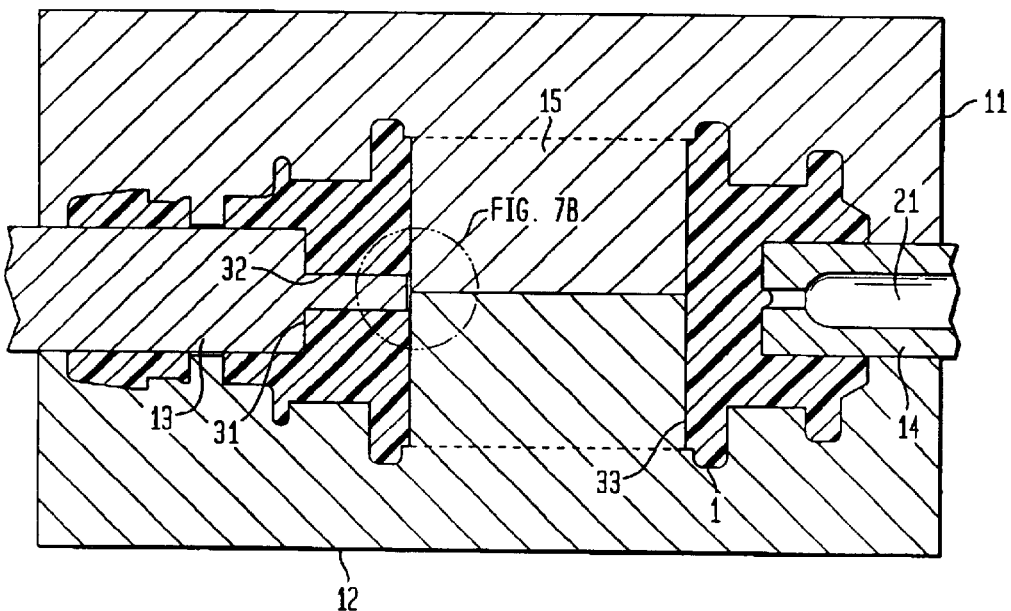
FIG. 7 is a sectional view showing a prior art resin piston for a master cylinder and dies and cores for the injection molding of the resin piston for a master cylinder.
Figure 7B:
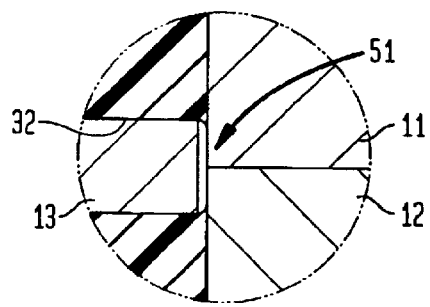

FIG. 6 is a sectional view of the resin piston for a master cylinder of the fourth embodiment according to the present invention. By the provision of the projecting part 35 on the inner wall surface of the through-hole 33, the stopper pin 43 is not touched to the burrs generated at the communicating section 51.

Thereby, it is prevented that the stem 42 is caught by the burrs, molded at the communicating section 51, to disable the work of the valve mechanism 41, and furthermore there are no possibilities that the stopper pin 43 pushes and bends the burrs and then the burrs that have been pushed and bent catch the stem 42 inserted into the communicating hole 32.

Furthermore, the present invention is not limited to the aforesaid embodiments, and obviously many changes and variations are possible therein without departing from scope and the sprit of the invention described in the claims. It is therefore needless to say that the changes and variations are within the present invention.

What is claimed is:

1. A resin piston for a master cylinder comprising: a through-hole through which a stopper pin being a component of a valve mechanism of said master cylinder is inserted, a concavity in which said valve mechanism is fixed by being inserted therein, and a communicating hole communicating with said through-hole from said concavity, said resin piston for a master cylinder being molded by injection of a resin material; and a burr generated by a flow of said resin material into a gap between a combined molding die and a core in a process of molding of said resin piston by injection molding, said burr projecting out from said communicating hole into the through-hole;

wherein a groove is provided in a portion of an inner wall surface of said through-hole, the groove facing away from said communicating hole, the groove being in the shape of a flat surface oriented in a direction substantially perpendicular to the longitudinal direction in which said stopper pin travels in operation of said master cylinder, a width of said groove being narrower than a width of said through-hole and wider than a diameter of said stopper pin.

2. A master cylinder equipped with a resin piston for said master cylinder, said resin piston for a master cylinder comprising:

a through-hole through which a stopper pin being a component of a valve mechanism of said master cylinder is inserted, a concavity in which said valve mechanism is fixed by being inserted therein, and a communicating hole communicating with said through-hole from said concavity, said resin piston for a master cylinder being molded by injection of a resin material;

a burr generated by a flow of said resin material into a gap between a combined molding die and a core in a process of molding of said resin piston for a master cylinder by injection molding, said burr projecting out from said communicating hole into the through-hole, wherein said through-hole is molded with a core for through-hole molding; said concavity and said communicating hole are molded with a core for molding a concavity; and a groove is provided in a portion of an inner wall surface of said through-hole, the groove facing away from said communicating hole, the groove being in the shape of a flat surface oriented in a direction substantially perpendicular to the longitudinal direction in which said stopper pin travels in operation of said master cylinder, a width of said groove being narrower than a width of said through-hole and wider than a diameter of said stopper pin.

* * * * *